US011413950B2

(12) United States Patent
Jackson

(10) Patent No.: US 11,413,950 B2
(45) Date of Patent: Aug. 16, 2022

(54) POWER FLYWHEEL MOTOR

(71) Applicant: Ethan Ethmer Jackson, Coarsegold, CA (US)

(72) Inventor: Ethan Ethmer Jackson, Coarsegold, CA (US)

(73) Assignee: Ethan E. Jackson, Morgan Hill, CA (US)

( * ) Notice: Subject to any disclaimer, the term of this patent is extended or adjusted under 35 U.S.C. 154(b) by 308 days.

(21) Appl. No.: 16/855,997

(22) Filed: Apr. 22, 2020

(65) Prior Publication Data

US 2021/0331573 A1    Oct. 28, 2021

(51) Int. Cl.
| | |
|---|---|
| *B60K 6/10* | (2006.01) |
| *B60K 6/30* | (2007.10) |
| *H02K 7/02* | (2006.01) |
| *B60L 50/30* | (2019.01) |
| *F16F 15/30* | (2006.01) |

(52) U.S. Cl.
CPC ............. *B60K 6/105* (2013.01); *H02K 7/025* (2013.01); *B60K 6/30* (2013.01); *B60L 50/30* (2019.02); *B60L 2240/421* (2013.01); *F16C 2361/55* (2013.01); *F16F 15/30* (2013.01)

(58) Field of Classification Search
CPC ........... B60K 6/105; B60K 6/30; B60L 50/30; B60L 2240/421; H02K 7/025; F16C 2361/55; F16F 15/30
See application file for complete search history.

(56) References Cited

U.S. PATENT DOCUMENTS

| | | | |
|---|---|---|---|
| 5,124,605 A | 6/1992 | Bitterly et al. | |
| 5,212,026 A | 5/1993 | Mitchell | |
| 5,614,777 A | 5/1997 | Bitterly et al. | |
| 6,388,347 B1* | 5/2002 | Blake | F16C 39/02 74/572.11 |
| 6,753,619 B2 | 6/2004 | Stevenson et al. | |
| 8,946,958 B2 | 2/2015 | Roberts | |
| 9,325,217 B2* | 4/2016 | Veltri | F16C 39/063 |
| 9,457,671 B2 | 10/2016 | Manganaro | |
| 9,718,343 B2 | 8/2017 | Atkins et al. | |
| 2002/0043884 A1 | 4/2002 | Hunter | |
| 2012/0190461 A1* | 7/2012 | Atkins | F16F 15/30 464/29 |

FOREIGN PATENT DOCUMENTS

GB     2353146 B1    9/2004

* cited by examiner

*Primary Examiner* — John D Walters

(57) ABSTRACT

A power flywheel motor is generally disclosed. In use, a flywheel assembly includes at least one motor-generator and a housing adapted to receive the flywheel assembly. The flywheel assembly is rotatable in the housing about a central axis. The motor-generator is configured to convert between electrical energy and kinetic energy associated with a rotation of the flywheel assembly.

9 Claims, 26 Drawing Sheets

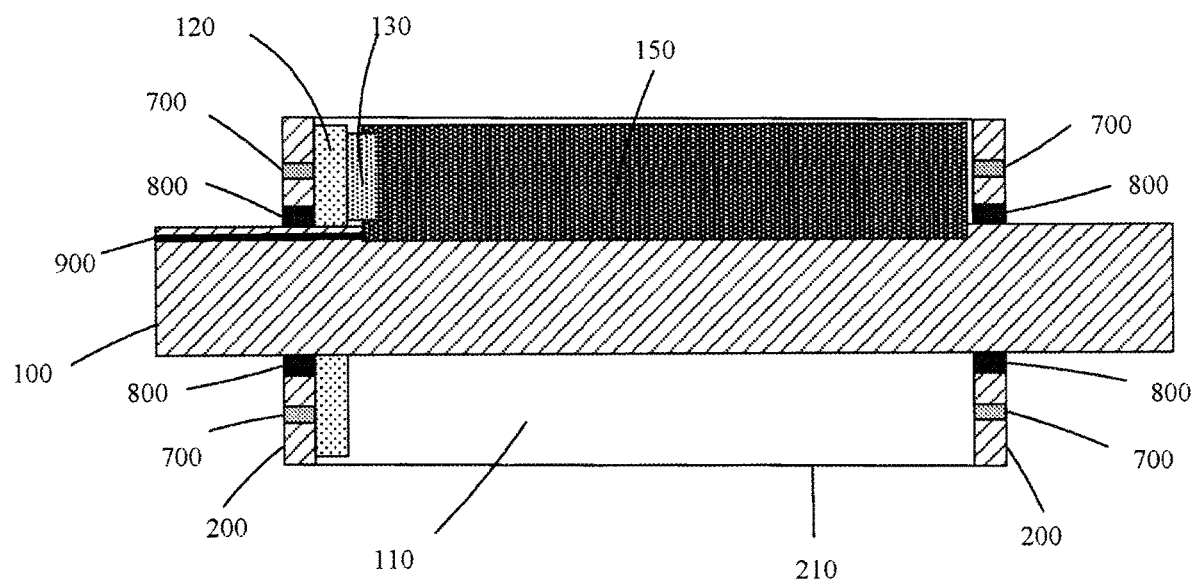
FIG. 1B1

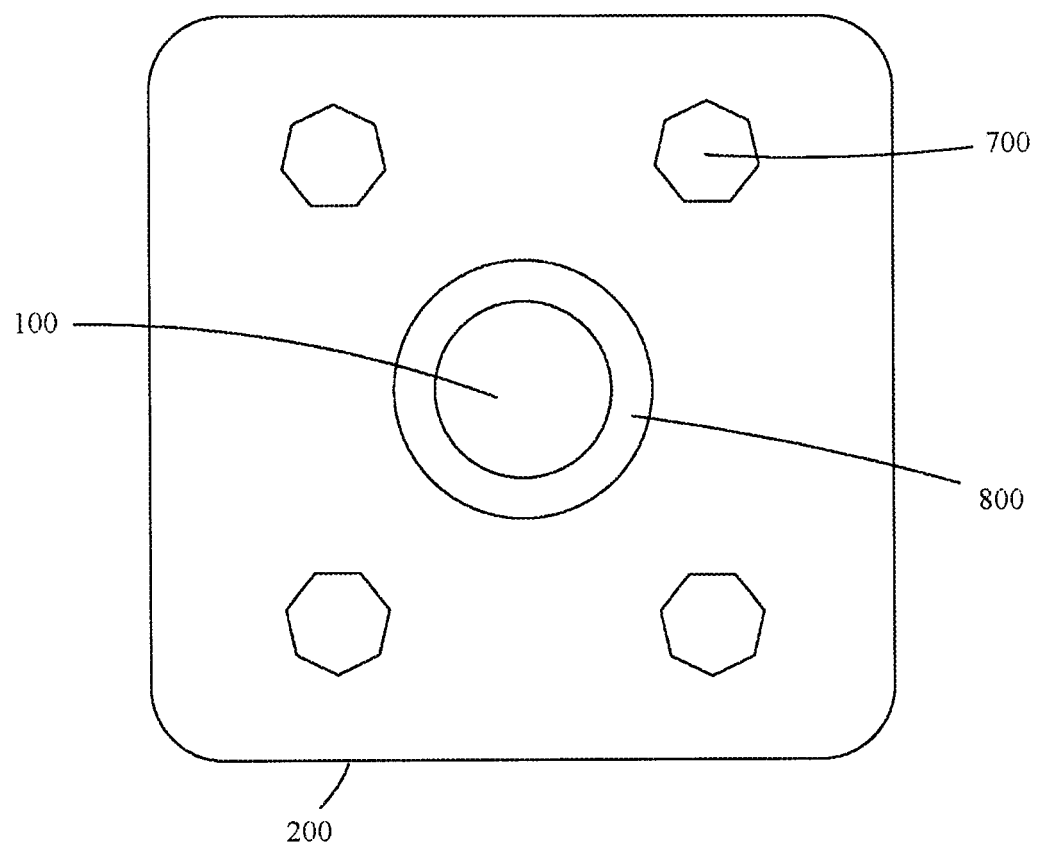
FIG. 1B2

US 11,413,950 B2

POWER FLYWHEEL MOTOR

FIELD OF THE INVENTION

The present invention generally relates to power motors, and in particular, an energy storage device using a flywheel.

BACKGROUND

A flywheel can be used to store energy by converting potential energy stored in the flywheel into kinetic energy associated with a rotating flywheel. Energy may subsequently be extracted from the storage system by converting or transferring the kinetic energy of the flywheel.

However, one problem with the use of a flywheel-based energy storage system, particularly in an electric vehicle, is the drag on a vehicle caused by the weight of a flywheel, motor, battery, and control unit.

SUMMARY

A power flywheel motor is generally disclosed. In use, a flywheel assembly includes at least one motor-generator and a housing adapted to receive the flywheel assembly. The flywheel assembly is rotatable in the housing about a central axis. The motor-generator is configured to convert between electrical energy and kinetic energy associated with a rotation of the flywheel assembly.

BRIEF DESCRIPTION OF THE DRAWINGS

FIG. 1B1 illustrates a cross sectional view of the interior of a power flywheel motor, in accordance with one embodiment.

FIG. 1B2 illustrates an end view of the housing of a power flywheel motor of FIG. 1A, in accordance one embodiment.

FIG. 5I illustrates a step in constructing a power flywheel motor with a plurality of motor-generators, a plurality of power supply, and a plurality of controls devices, in accordance with one embodiment.

DETAILED DESCRIPTION

In one embodiment, a power flywheel motor may overcome the drawbacks of a conventional Electric Vehicle (EV), including a limited range of travel due to inefficiency, size, and weight of the battery or batteries, motor or motors, and control devices all being separate components. Generally, the power flywheel motor may use otherwise separate components such as battery or batteries, motor-generator or motor-generators, and control device or devices to function as a flywheel.

Figure 1A:
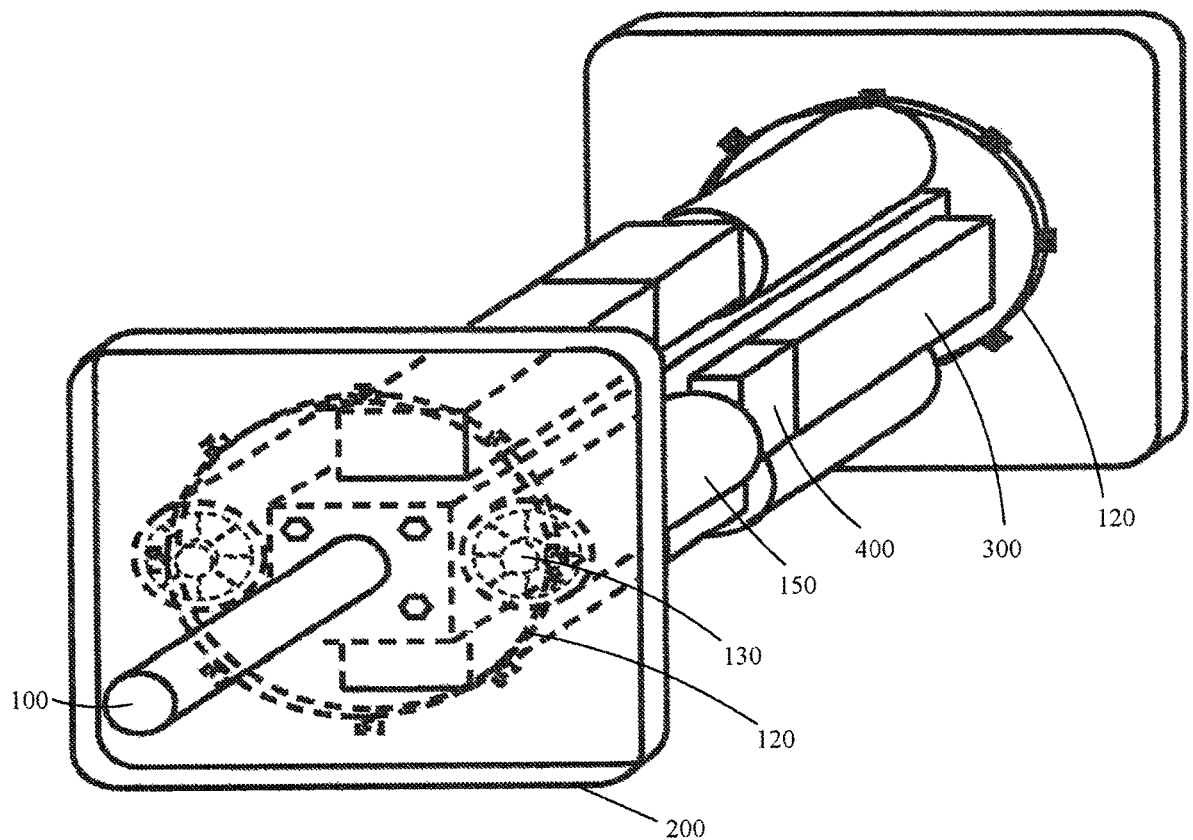
FIG. 1A illustrates a power flywheel motor, in accordance with one embodiment.

FIG. 1A illustrates a power flywheel motor, in accordance with one embodiment. As an option, FIG. 1A may be implemented in the context of any one or more of the embodiments set forth in any previous and/or subsequent figure(s) and/or description thereof. Of course, however, FIG. 1A may be implemented in the context of any desired environment. Further, the aforementioned definitions may equally apply to the description below.

As shown, FIG. 1A shows a power flywheel motor, including a shaft 100, a first traction surface 120, a second traction surface 130, a motor-generator 150, a housing 200, a power supply 300, and/or a control device 400.

In one embodiment, the power flywheel motor system may include a shaft rotatable about a first axis, and a flywheel coupled coaxially to the shaft, and including a motor-generator coupled to the flywheel such that a mass of the motor-generator contributes to an energy storage capacity of the flywheel at a selected rotation speed of the flywheel. Additionally, the motor-generator comprises a first traction surface rotatable about a second axis substantially parallel to the first axis.

In another embodiment, a housing may include a second traction surface and a cavity configured to receive the shaft and the flywheel, where the second traction surface and the first traction surface are configured to interact to enable the motor-generator to facilitate the storage or release of energy. Further, an electrical connector may be connected to the motor-generator and configured to enable flow of electrical current to enable the storage or the release of the energy.

In a further embodiment, the electrical connector may be configured to communicate an electrical signal that causes the motor-generator to rotate the first traction surface to facilitate the storage of the energy by causing the rotation speed of the flywheel to increase. Additionally, the electrical connector may be configured to communicate an electrical signal to enable the release of energy, the release of energy being associated with a decrease in the rotation speed of the flywheel and being facilitated by the interaction between the first traction surface and the second traction surface.

In one embodiment, the flywheel may include a power supply coupled to the flywheel such that the mass of the power supply contributes to the energy storage capacity of the flywheel at the selected rotation speed of the flywheel. Additionally, the power supply may be coupled to the flywheel at a location that facilitates a balance of the center of the mass of the flywheel about the first axis. In another embodiment, a second electrical connection may be connected to the power supply and the motor-generator. Further, the first electrical connection and the second electrical connection are a same single electrical connection.

In another embodiment, a control device may be configured to balance the center of the mass of the flywheel about the first axis. A third electrical connection may be connected to the control device and the motor-generator, and the third electrical connection may be configured to communicate an electrical signal, and the control device may facilitate an energy profile of the flywheel.

Still yet, in one embodiment, the second traction surface of the housing may include a ring gear, and the first traction surface may include a gear adapted to interact with the ring gear. Additionally, the flywheel may include a plurality of motor-generators coupled to the flywheel such that the mass of the motor-generators contributes to the energy storage capacity of the flywheel at the selected rotation speed of the flywheel, wherein the motor-generators are coupled to the flywheel at locations that facilitate a balance of the center of the mass of the flywheel about the first axis.

In one embodiment, the flywheel may include four electric motors (two motors on each end), six electric motors (three motors on each end), and/or even eight electric motors (four motors on each side). Additionally, the electric motor shafts may use small gears which in turn may drive a larger ring gear, which may result in a gear reduction and thereby multiply the amount of torque resulting in the drive shaft. Further, in another embodiment, the power flywheel assembly may function as a complete power unit, such that the mass of the combination of the motors and batteries may store kinetic energy.

In another embodiment, mounting plates may be located at both ends of the power flywheel motor and may provide support for the drive shaft and any support bearing. The mounting plate(s) may further allow the power flywheel motor to be mounted to a vehicle, machine frame, transmission, drive train, wheel(s), and/or clutch. If one end of the power flywheel motor drive shaft is used to provide power to a drive train, the opposite end of the power flywheel motor drive shaft can be used to power small hydraulic pumps, air pumps, and/or vacuum pumps, commonly utilized for steering and braking.

In one embodiment, on the inside of the mounting plates a large ring gear may be secured. The smaller gears attached to the electric motors mounted on the drive shaft may be engaged with the ring gears which may provide gear reduction and may increase the torque provided. Further, the use of gears can provide for an efficient transfer of power from the electric motors to the ring gear, resulting in the rotation of the drive shaft. In other embodiments, such as in lighter applications (including, for example, toy cars or small recreational vehicles), the use of a V-grove wheels or friction surface may be used in place of gears.

In another embodiment, once electrical power is supplied to the electric motors, the drive shaft, the electric motors, the controls, and/or the batteries may commence rotating. The drive shaft, along with the mass of the electric motors, the controls, and/or the batteries may function as a flywheel which may store potential energy. As the speed of the drive shaft increases, the potential energy stored in the power flywheel motor would also increase. In one embodiment, a vehicle may require more power to accelerate from a stop than when the vehicle is already in motion. Thus, the power flywheel motor may be used (in the form of stored potential energy) to provide a surge of power to overcome the static friction and cause the vehicle to be put in motion. Once the vehicle is in motion, the amount of power to accelerate decreases. In conventional electric vehicles, an electric motor(s) may be directly attached to the wheel or drive train without the benefit of a flywheel. As such, the size and power usage of the electric motors on the power flywheel motor, as disclosed herein, may be less than an identical vehicle using a conventional or traditional electric motor.

Further, in one embodiment, the power flywheel motor may include multiple motors. These multiple motors in the power flywheel motor provide a redundancy system such that if one power system fails a secondary system may be engaged. For example, if one electric motor fails, the remaining electric motors could keep the power flywheel motor operational until repairs can be made, and/or the failed electric motor becomes operational once again.

In one embodiment, the power flywheel motor may function as a redundant power source to a primary power source. For example, in an aircraft, a redundant system may improve reliability by acting as a backup power source. If the primary fuel system fails, a secondary power source may keep the aircraft flying. The multiple motors in a power flywheel motor-generator may provide a similar redundant system. If one electric motor-generator fails, the remaining electric motor-generator may keep the power flywheel motor operational until repairs can be made.

In another embodiment, control of the power flywheel motor may occur by radio signal, by wired connection, and/or by any wireless connection. For example, in one embodiment, a transmitter controlled by a driver or operator may send a radio signal to the control unit on the power flywheel motor, which in turn may then provide power to the electric motors. The control unit may adjust and/or control the revolutions per minute (or speed) of the power flywheel motor. In one embodiment, including for a motor vehicle, the transmitter may be positioned like a foot throttle. When the throttle pedal is pressed, a radio signal may be sent to a receiver in the controls on the power flywheel motor. The receiver may be wired to a speed controller that supplies power to the electric motors causing the power flywheel motor to begin rotating at a desired revolution (i.e. speed). As the throttle is pressed or released, the transmitter communicates the throttle adjustment to the receiver, and the receiver in turn communicates an increase or decrease in speed parameter of the power flywheel motor to the speed controller. Of course, in other embodiments, any other wired (e.g., LAN, etc.) or wireless communication (e.g. WiFi, Bluetooth, etc.) may be used.

In another embodiment, the control of a plurality of motor-generators may occur by a control device. The control device may enable concurrent flow and equal distribution of electrical current to the plurality of motor-generators. The electrical current enables the rotational speed of the motor-generators to rotate at substantially similar speed.

In another embodiment, a master control device may monitor and transmit signals to a plurality of control devices controlling a plurality of motor-generators. Each control device monitors and transmits signal to an assigned motor-generator to control rotational speed enabling conservation of electricity. For example, when the power flywheel motor is maintaining a predefined rotational speed, one motor-generator may function as a motor while the remaining motor-generators may disengage. The rotational energy of the power flywheel motor may be used to produce an electrical current to charge a battery or a capacitor, such as by being mechanically coupled to a motor-generator, e.g., an external or internal motor-generator. Current electric vehicles produce electricity through "regenerative braking." A power flywheel motor may use this energy to charge its internal batteries or to store such energy as rotational kinetic energy. Each individual control device may selectively control a motor-generator to be configured to function as motor or generator or to be disengaged.

In various embodiments, the batteries of the power flywheel motor may require charging similar to current batteries used conventionally in electric vehicles. A plug allowing an outside electric power source may be mounted in the control unit of the power flywheel motor. When the vehicle is not in use the power flywheel motor may be stationary and may be plugged in for charging. In one embodiment, the controls may also include battery conditioners and battery monitoring. Further, a vehicle may require additional batteries outside the power flywheel motor (for such things as powering lights, instrument panel, brakes, and/or steering, etc.). The charging system may allow for the charging of both (such as simultaneous) the power flywheel motor and the auxiliary batteries in the vehicle and/or the device.

In an embodiment, the multiple electric motors of the power flywheel motor may be arranged in a radial pattern around a drive shaft to which they are mounted.

In a particular embodiment, the operating RPM of the flywheel is adapted to be substantially similar to the operating RPM of an internal combustion engine, such as between 500 and 5000 RPM, to simplify use of the power flywheel motor as a replacement for an internal combustion engine.

FIG. 1B1 illustrates a cross sectional view of the interior of a power flywheel motor, in accordance with one embodiment. As an option, FIG. 1B1 may be implemented in the context of any one or more of the embodiments set forth in any previous and/or subsequent figure(s) and/or description thereof. Of course, however, FIG. 1B1 may be implemented in the context of any desired environment. Further, the aforementioned definitions may equally apply to the description below.

The power flywheel motor of FIG. 1B1 may include a shaft 100, a motor-generator 150 with a second traction surface 130. The flywheel assembly may be enclosed in a housing 200 and 210. A cavity 110 may be adapted to house the flywheel assembly and may allow for interaction between the traction second surface 130 with the first traction surface 120. When the power flywheel motor is in charge mode, an electrical connection 900 (such as provided by kinetic energy and/or an electrical input) may provide energy to the flywheel. When the power flywheel motor is in generation mode, the electrical connection 900 may transfer energy from the flywheel assembly. In the charge mode, the mounted motor-generator 150 may convert, for example, electrical energy into rotational kinetic energy. In another embodiment, the external kinetic energy may rotate the shaft 100 to store rotational kinetic energy in the flywheel assembly. In generation mode, the energy may be reversed to provide either the electrical energy from the rotating flywheel assembly or the kinetic energy from the rotating shaft 100 to a drive shaft or to a belt drive (not shown).

Additionally, FIG. 1B1 includes a frictionless surface 800 and multiple attachment points and screws 700 which may be used for support and stability.

FIG. 1B2 illustrates an end view of the housing 200 of a power flywheel motor of FIG. 1A in accordance one embodiment. As an option, FIG. 1B2 may be implemented in the context of any one or more of the embodiments set forth in any previous and/or subsequent figure(s) and/or description thereof. Of course, however, FIG. 1B2 may be implemented in the context of any desired environment. Further, the aforementioned definitions may equally apply to the description below.

The housing 200 located at opposite ends of the flywheel assembly provide support suitable for variety of applications. The shaft 100 may be fitted through a frictionless surface 800. Multiple attachment points and screws 700 may be used for support and stability.

Figure 1C:
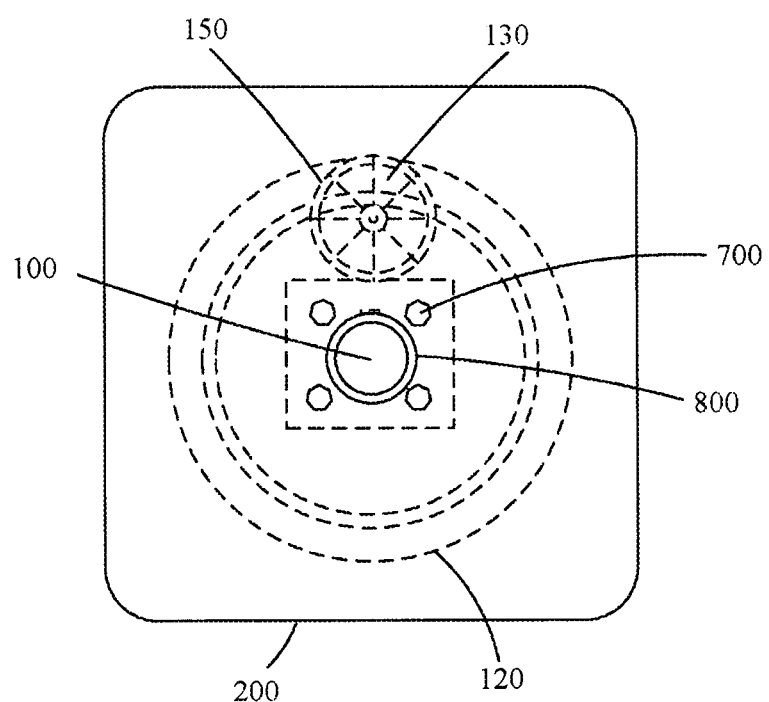
FIG. 1C illustrates an end view of a housing with see through parts of a power flywheel motor, in accordance with one embodiment.

FIG. 1C illustrates an end view of a housing with see through parts of a power flywheel motor, in accordance with one embodiment. As an option, FIG. 1C may be implemented in the context of any one or more of the embodiments set forth in any previous and/or subsequent figure(s) and/or description thereof. Of course, however, FIG. 1C may be implemented in the context of any desired environment. Further, the aforementioned definitions may equally apply to the description below.

The motor-generator 150 may rotate around the shaft 100. The second traction surface 130 may be confined to rotate within the first traction surface 120. The first traction surface 120 may be coupled to the housing 200.

Figure 1D:
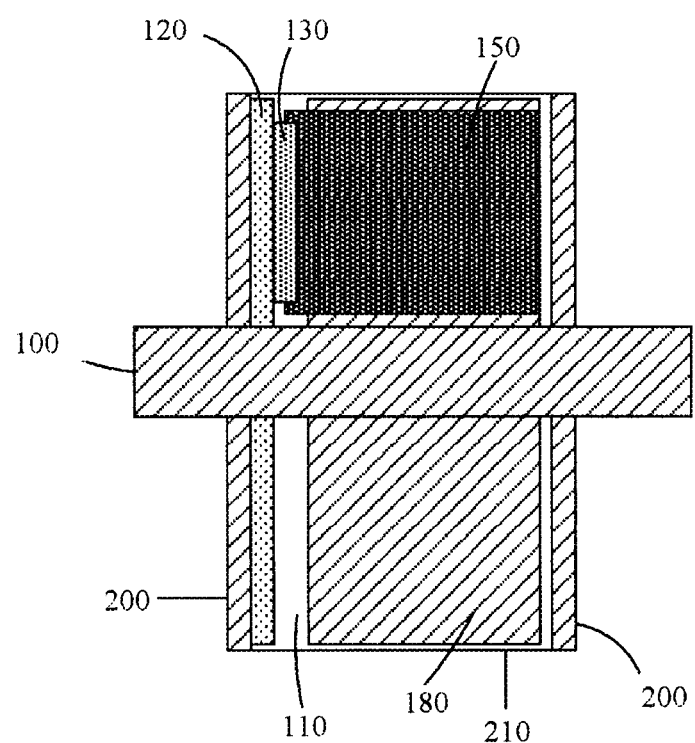
FIG. 1D illustrates a cross sectional view of the interior of a power flywheel motor, in accordance with one embodiment.

FIG. 1D illustrates a cross sectional view of the interior of a power flywheel motor, in accordance with one embodiment. As an option, FIG. 1D may be implemented in the context of any one or more of the embodiments set forth in any previous and/or subsequent figure(s) and/or description thereof. Of course, however, FIG. 1D may be implemented in the context of any desired environment. Further, the aforementioned definitions may equally apply to the description below.

The power flywheel motor comprises a flywheel assembly may include a shaft 100, a motor-generator 150 with a second traction surface 130, and a cylindrical mass 180. The motor-generator 150 may be mounted on the cylindrical mass 180 to rotationally balance the combined mass around the shaft 100. The flywheel assembly may be enclosed in a housing 200 and 210. In one embodiment, the housing 200 may include a mounting plate for the flywheel assembly, and the housing 210 may including an enclosing portion around the flywheel assembly. The cavity 110 may be adapted to receive the flywheel assembly. During the charge or generation mode, the second traction surface 130 may interact with the first traction surface 120.

Figure 2A:
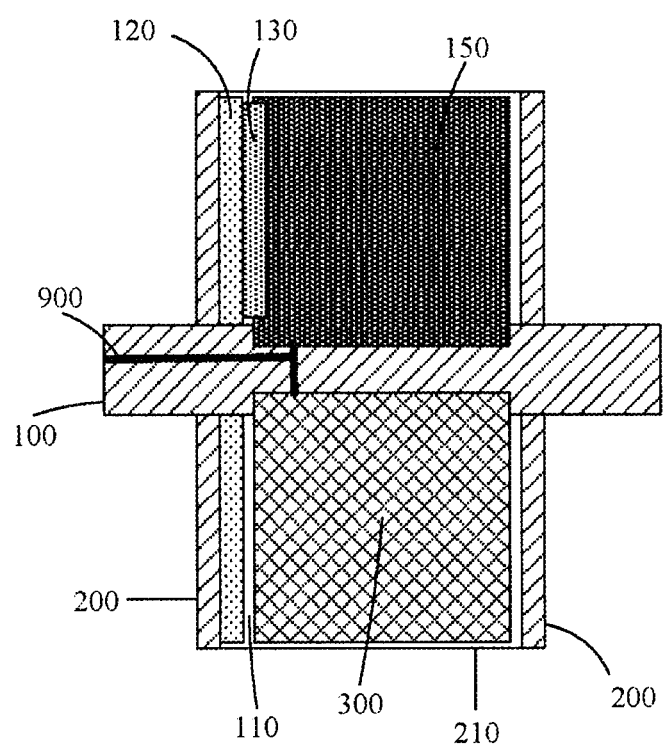
FIG. 2A illustrates a cross sectional view of the interior of a power flywheel motor with a motor-generator and a power supply, in accordance with one embodiment.

FIG. 2A illustrates a cross sectional view of the interior of a power flywheel motor with a motor-generator and a power supply, in accordance with one embodiment. As an option, FIG. 2A may be implemented in the context of any one or more of the embodiments set forth in any previous and/or subsequent figure(s) and/or description thereof. Of course, however, FIG. 2A may be implemented in the context of any desired environment. Further, the aforementioned definitions may equally apply to the description below.

The flywheel assembly may include a shaft 100, a motor-generator 150 with a second traction surface 130, and a power supply 300. As shown, in one embodiment, any or all of the motor-generators 150, the second traction surface 130, and/or the power supply 300 may be mounted on the shaft 100.

Figure 2B:
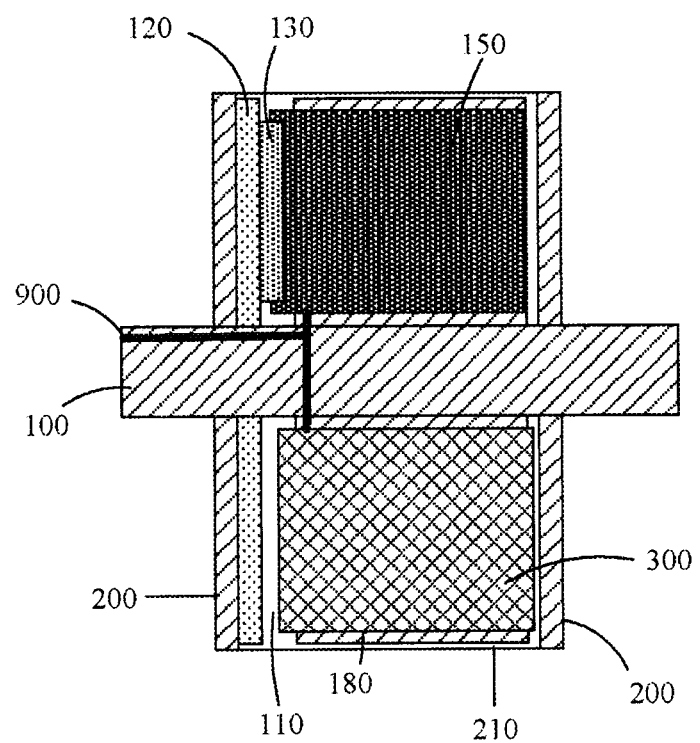
FIG. 2B illustrates a cross sectional view of the interior of a power flywheel motor with a motor-generator and a power supply, in accordance with one embodiment.

FIG. 2B illustrates a cross sectional view of the interior of a power flywheel motor with a motor-generator and a power supply, in accordance with one embodiment. As an option, FIG. 2B may be implemented in the context of any one or more of the embodiments set forth in any previous and/or subsequent figure(s) and/or description thereof. Of course, however, FIG. 2B may be implemented in the context of any desired environment. Further, the aforementioned definitions may equally apply to the description below.

The power flywheel motor may include a shaft 100, a motor-generator 150, a second traction surface 130, a power supply 300, and a cylindrical mass 180. As shown, the motor-generator 150 and the power supply 300 may be mounted directly to the cylindrical mass 180 to rotationally balance the combined mass around the shaft 100.

Figure 3A:
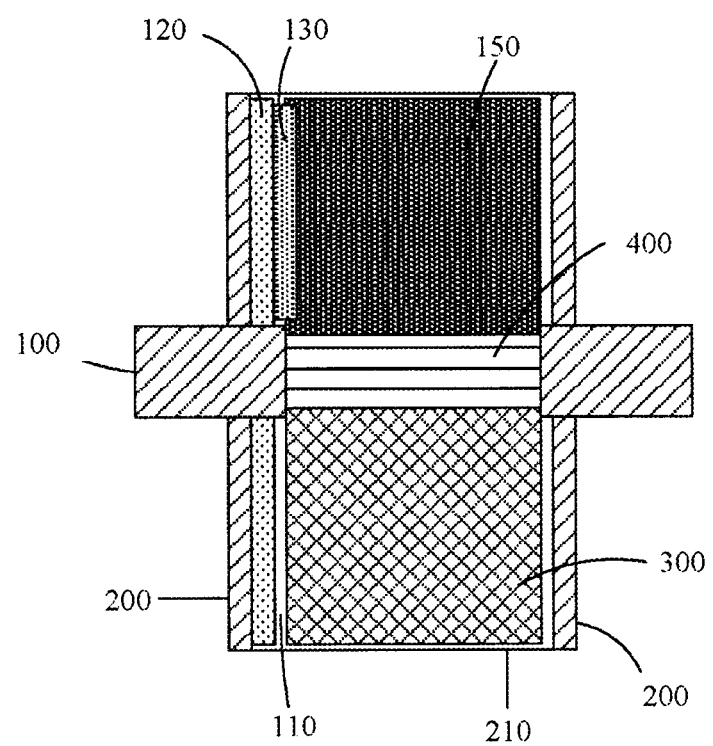
FIG. 3A illustrates a cross sectional view of the interior of a power flywheel motor with motor-generator, a power supply, and a control device, in accordance with one embodiment.

FIG. 3A illustrates a cross sectional view of the interior of a power flywheel motor with motor-generator, a power supply, and a control device, in accordance with one embodiment. As an option, FIG. 3A may be implemented in the context of any one or more of the embodiments set forth in any previous and/or subsequent figure(s) and/or description thereof. Of course, however, FIG. 3A may be implemented in the context of any desired environment. Further, the aforementioned definitions may equally apply to the description below.

The power flywheel motor may include a shaft 100, motor-generator 150, a second traction surface 130, a power supply 300, and a control device 400. In one embodiment, the control device 400 may regulate the energy storage of the power flywheel motor. As shown, the control device 400 may be mounted around the shaft 100.

Figure 3B:
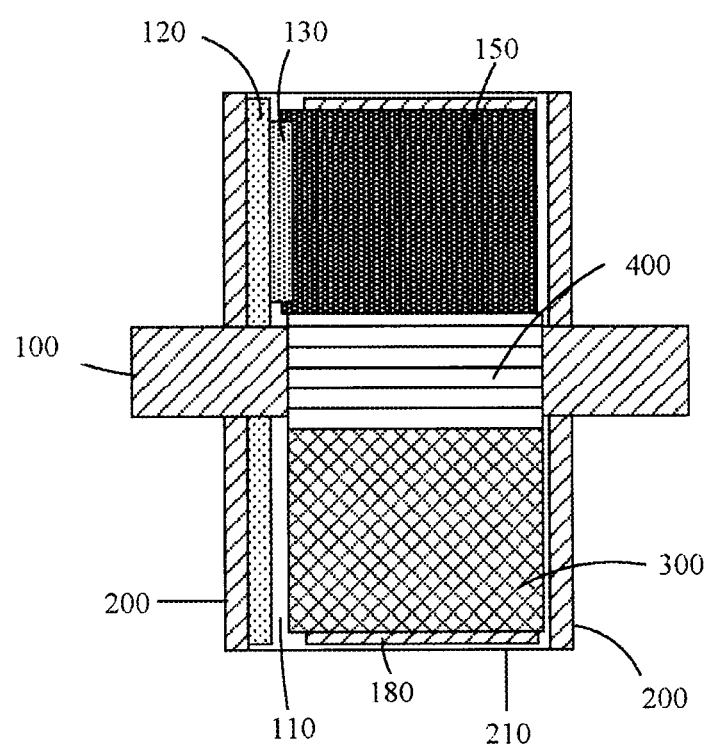
FIG. 3B illustrates a cross sectional view of the interior of a power flywheel motor with a motor-generator, a power supply, and a control device, in accordance with one embodiment.

FIG. 3B illustrates a cross sectional view of the interior of a power flywheel motor with a motor-generator, a power supply, and a control device, in accordance with one embodiment. As an option, FIG. 3B may be implemented in the context of any one or more of the embodiments set forth in any previous and/or subsequent figure(s) and/or description thereof. Of course, however, FIG. 3B may be implemented in the context of any desired environment. Further, the aforementioned definitions may equally apply to the description below.

The power flywheel motor may include a shaft 100, a motor-generator 150, a second traction surface 130, a power supply 300, a control device 400, and a cylindrical mass 180. As shown, the motor-generator 150, the power supply 300 and/or the control device 400 may be mounted onto the cylindrical mass 180 to rotationally balance the combined mass around the shaft 100.

Figure 3C:
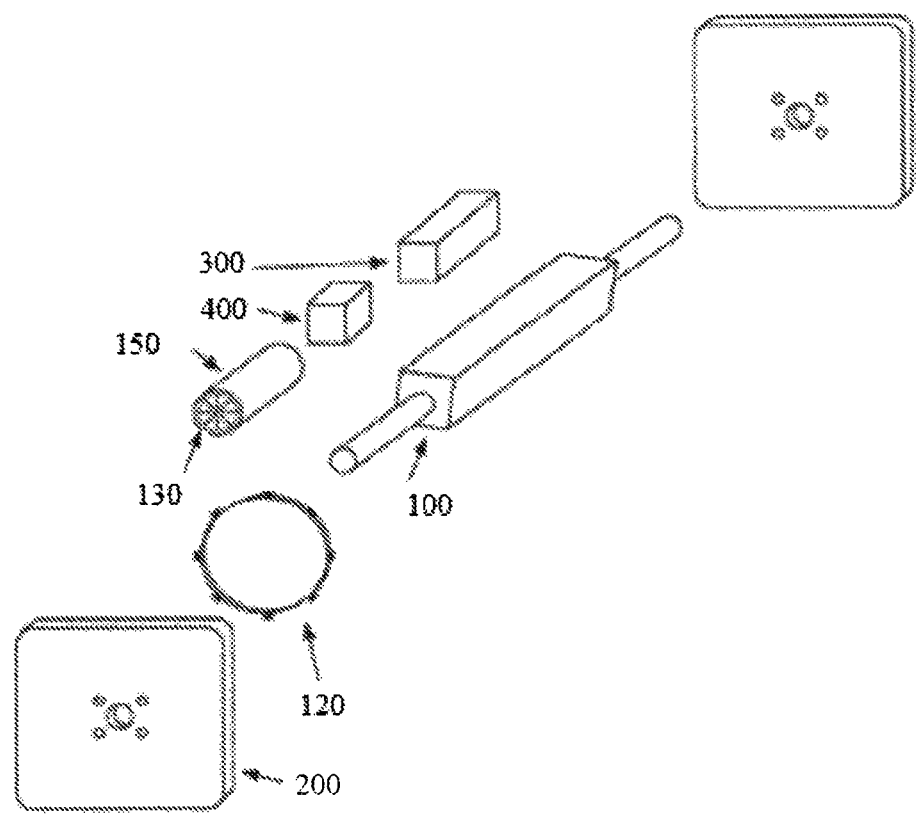
FIG. 3C illustrates an exploded view of a power flywheel motor with two housing walls, a ring gear, a shaft, a motor-generator, a control device, and a power supply, in accordance with one embodiment.

FIG. 3C illustrates an exploded view of a power flywheel motor with two housing walls, a ring gear, a shaft, a motor-generator, a control device, and a power supply, in accordance with one embodiment. As an option, FIG. 3C may be implemented in the context of any one or more of the embodiments set forth in any previous and/or subsequent figure(s) and/or description thereof. Of course, however, FIG. 3C may be implemented in the context of any desired environment. Further, the aforementioned definitions may equally apply to the description below.

The power flywheel motor may include a shaft 100, a motor-generator 150, a second traction surface 130, a power supply 300, and a control device 400. In the context of the present description, a traction surface (such as the first traction surface 120, the second traction surface 130, etc.) may include a gear assembly, a ring gear (or a gear ring), etc. The flywheel assembly may be supported by two housing walls 200 with a first traction surface 120. The control device 400 may regulate energy storage of the power flywheel motor. The first traction surface 120 may be coupled to the housing 200. The shaft 100 may be rotated to cause the second traction surface 130 to rotate around the first traction surface 120 or the second traction surface 130 may be rotated to cause the shaft 100 to rotate. In one embodiment, the number of traction surfaces (i.e. ring gears) may be one or more, including one ring gear per flywheel assembly, and/or multiple ring gears per flywheel assembly.

Figure 4A:
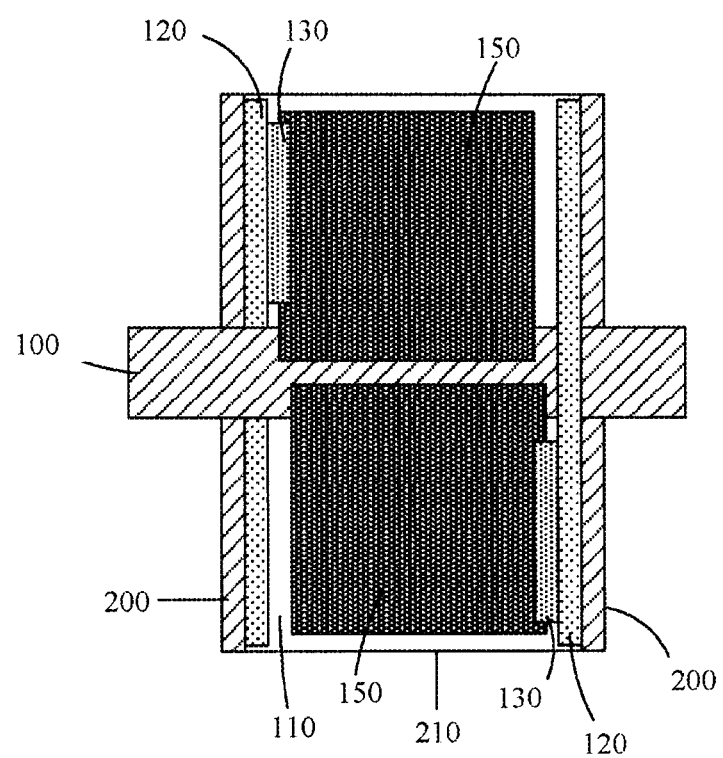
FIG. 4A illustrates cross sectional view of the interior of a power flywheel motor with a plurality of motors-generators, in accordance with one embodiment.

FIG. 4A illustrates cross sectional view of the interior of a power flywheel motor with a plurality of motors-generators, in accordance with one embodiment. As an option, FIG. 4A may be implemented in the context of any one or more of the embodiments set forth in any previous and/or subsequent figure(s) and/or description thereof. Of course, however, FIG. 4A may be implemented in the context of any desired environment. Further, the aforementioned definitions may equally apply to the description below.

The power flywheel motor may include a shaft 100, a plurality of motor-generators 150, and a second traction surface 130 (which may include a plurality of second traction surfaces). As shown, the plurality of motor-generators 150 includes more than one motor, and the motors selected may be the same motor such that weight distribution is the same (thereby allowing the motor-generators 150 to easily rotate).

Figure 4B:
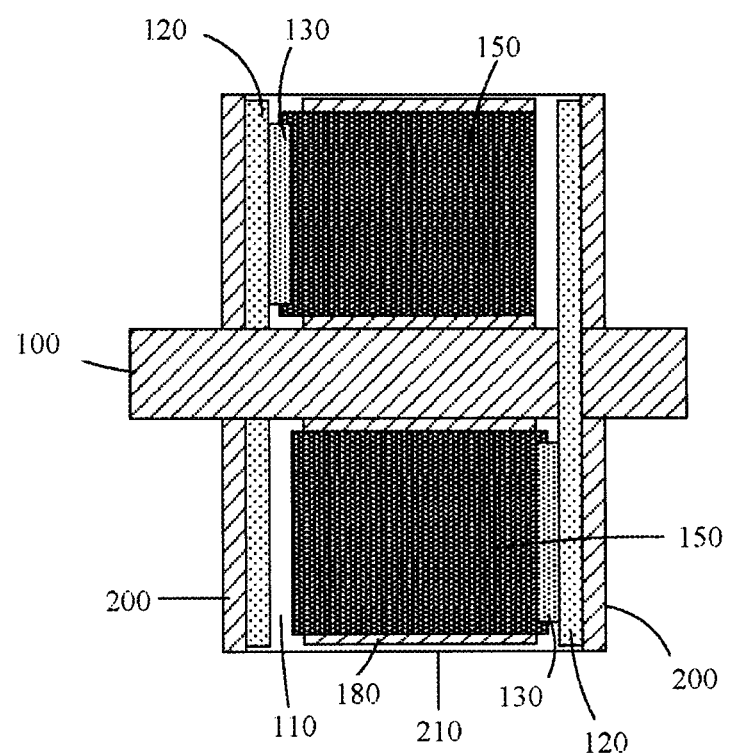
FIG. 4B illustrates a cross sectional view of the interior of a power flywheel motor with a plurality of motors-generators, in accordance with one embodiment.

FIG. 4B illustrates a cross sectional view of the interior of a power flywheel motor with a plurality of motors-generators, in accordance with one embodiment. As an option, FIG. 4B may be implemented in the context of any one or more of the embodiments set forth in any previous and/or subsequent figure(s) and/or description thereof. Of course, however, FIG. 4B may be implemented in the context of any desired environment. Further, the aforementioned definitions may equally apply to the description below.

The power flywheel motor comprising a flywheel assembly may include a shaft 100, a plurality of motor-generators 150, a plurality of second traction surface 130, and a cylindrical mass 180. The motor-generators 150 may be mounted to the cylindrical mass 180 to rotationally balance the combined mass around the shaft 100.

Figure 5A:
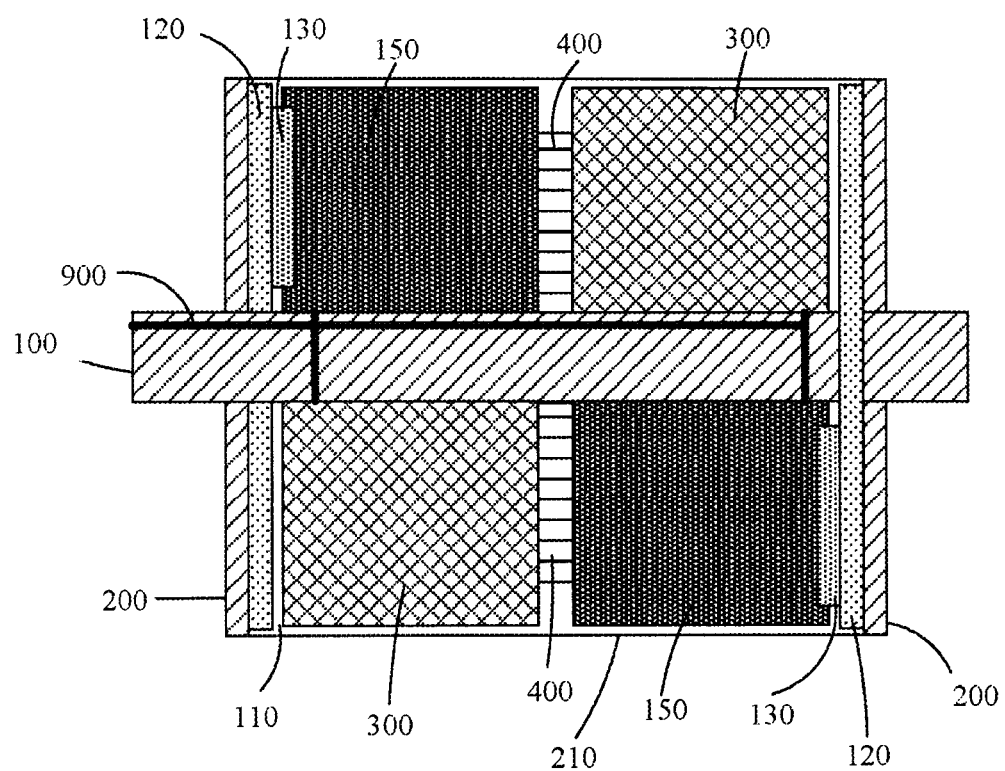
FIG. 5A illustrates a cross sectional view of the interior of a power flywheel motor with a plurality of motor-generators, a plurality of power supply, and a plurality of control devices, in accordance with one embodiment.

FIG. 5A illustrates a cross sectional view of the interior of a power flywheel motor with a plurality of motor-generators, a plurality of power supply, and a plurality of control devices, in accordance with one embodiment. As an option, FIG. 5A may be implemented in the context of any one or more of the embodiments set forth in any previous and/or subsequent figure(s) and/or description thereof. Of course, however, FIG. 5A may be implemented in the context of any desired environment. Further, the aforementioned definitions may equally apply to the description below.

The power flywheel motor may include a shaft 100, a plurality of multiple motor-generators 150, with a second traction surface 130, a plurality of power supplies 300, and a plurality of control devices 400 (one of the control devices is shown in FIG. 5A, and another control device would be potentially located behind that which is shown). The flywheel assembly is enclosed in a housing 200 and 210 with a first traction surface 120. The second traction surface 130 may interact with the first traction surface 120, such as, for example, in one embodiment, having the second traction surface 130 rotate around the first traction surface 120. The control devices 400 may regulate energy storage of the power flywheel motor. In one embodiment, a separate control device may be used to separately and independently control each power flywheel motor.

Figure 5B:
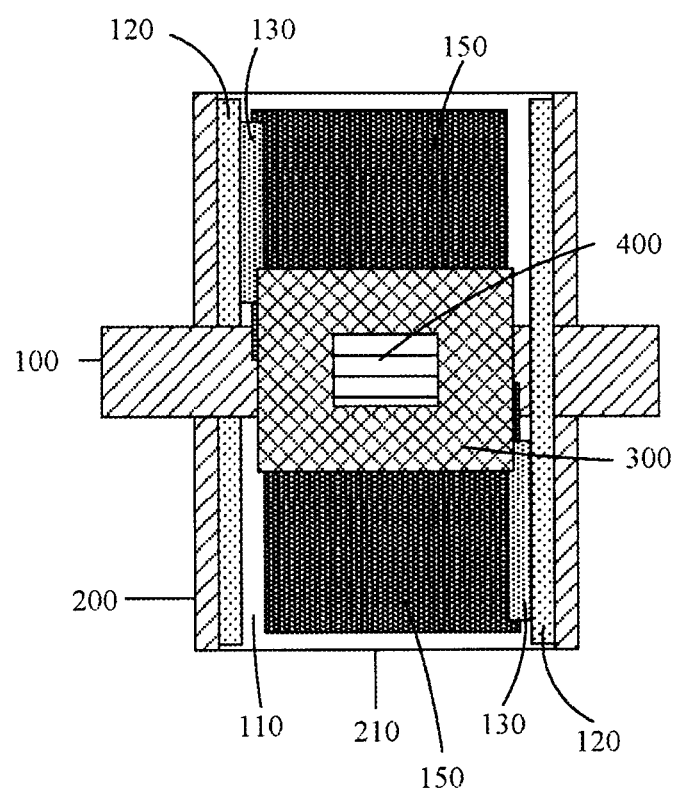
FIG. 5B illustrates a cross sectional view of the interior of a power flywheel motor with a plurality of motor-generators, a plurality of power supplies, and a plurality of control devices, in accordance with one embodiment.

FIG. 5B illustrates a cross sectional view of the interior of a power flywheel motor with a plurality of motor-generators, a plurality of power supplies, and a plurality of control devices, in accordance with one embodiment. As an option, FIG. 5B may be implemented in the context of any one or more of the embodiments set forth in any previous and/or subsequent figure(s) and/or description thereof. Of course, however, FIG. 5B may be implemented in the context of any desired environment. Further, the aforementioned definitions may equally apply to the description below.

The power flywheel motor may include a shaft 100, a plurality of motor-generators 150, a plurality of second traction surfaces 130, a plurality of power supplies 300, and a plurality of control devices 400. As shown, the plurality of power supplies 300 and the plurality of control devices 400 may be mounted to the shaft 100.

Figure 5C:
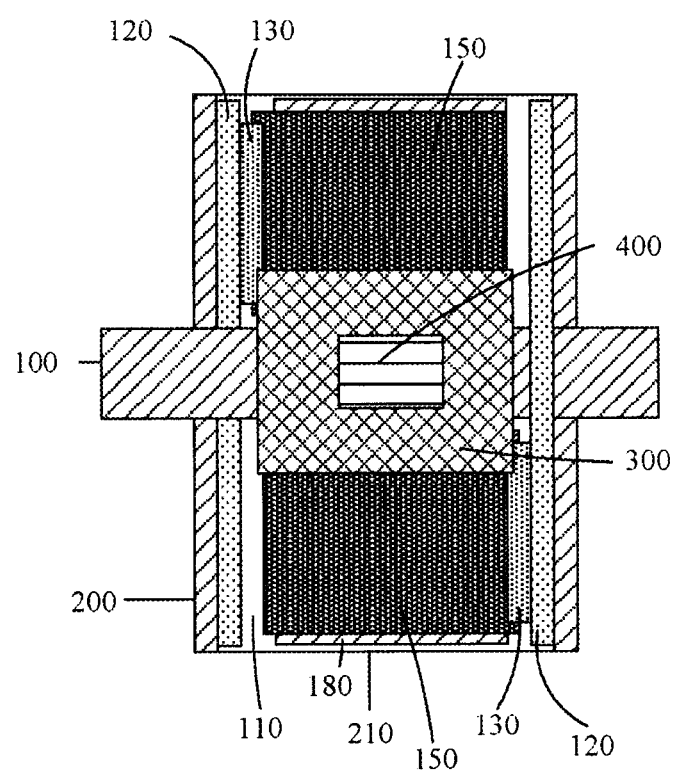
FIG. 5C illustrates a cross sectional view of the interior of a power flywheel motor with a plurality of motor-generators, a plurality of power supplies, and a plurality of controls devices, in accordance with one embodiment.

FIG. 5C illustrates a cross sectional view of the interior of a power flywheel motor with a plurality of motor-generators, a plurality of power supplies, and a plurality of controls devices, in accordance with one embodiment. As an option, FIG. 5C may be implemented in the context of any one or more of the embodiments set forth in any previous and/or subsequent figure(s) and/or description thereof. Of course, however, FIG. 5C may be implemented in the context of any desired environment. Further, the aforementioned definitions may equally apply to the description below.

The power flywheel motor may include a shaft 100, a plurality of motor-generators 150, a second traction surface 130, a plurality of power supplies 300, a plurality of control devices 400, and a cylindrical mass 180. The plurality of motor-generators 150, the plurality of power supplies 300, and the plurality of control devices 400 may all or individually be mounted on the cylindrical mass 180 to rotationally balance the combined mass around the shaft 100.

Figure 5D:
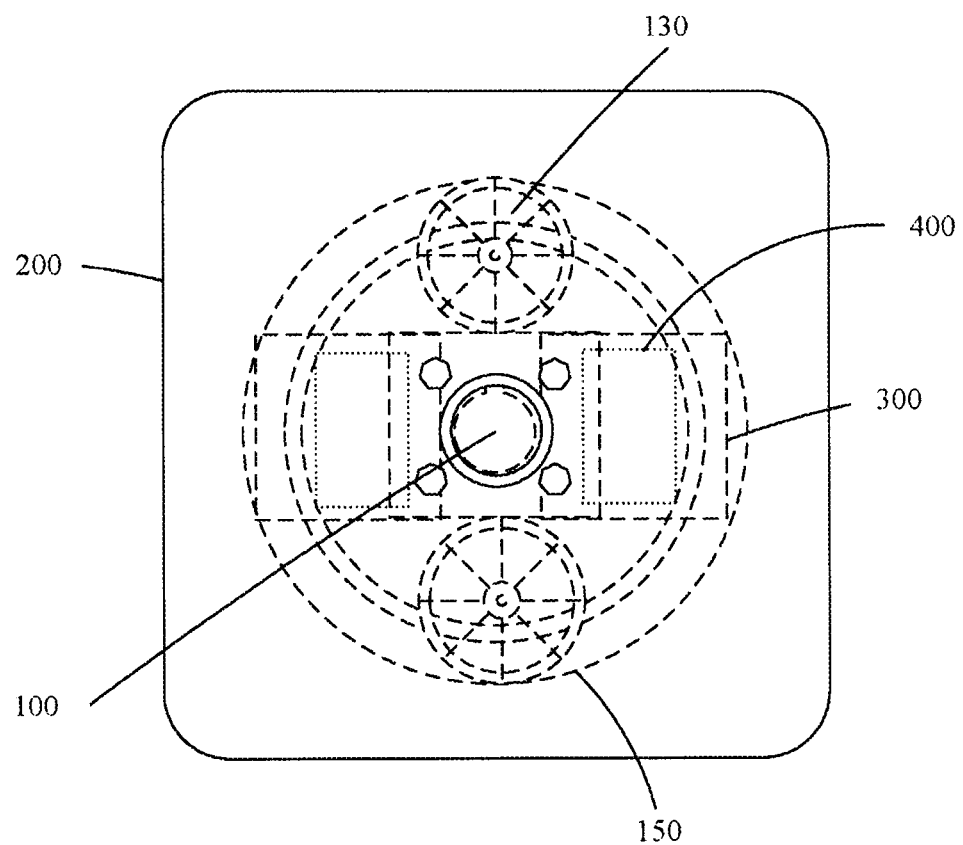
FIG. 5D illustrates an end view of a power flywheel motor with see through parts, in accordance with one embodiment.

FIG. 5D illustrates an end view of a power flywheel motor with see through parts, in accordance with one embodiment. As an option, FIG. 5D may be implemented in the context of any one or more of the embodiments set forth in any previous and/or subsequent figure(s) and/or description thereof. Of course, however, FIG. 5D may be implemented in the context of any desired environment. Further, the aforementioned definitions may equally apply to the description below.

As shown, in one embodiment, FIG. 5D shows one perspective of a power flywheel motor. From this perspective, a shaft 100, a motor-generator 150, a second traction surface 130, a power supply 300, and a control device 400.

Figure 5E:
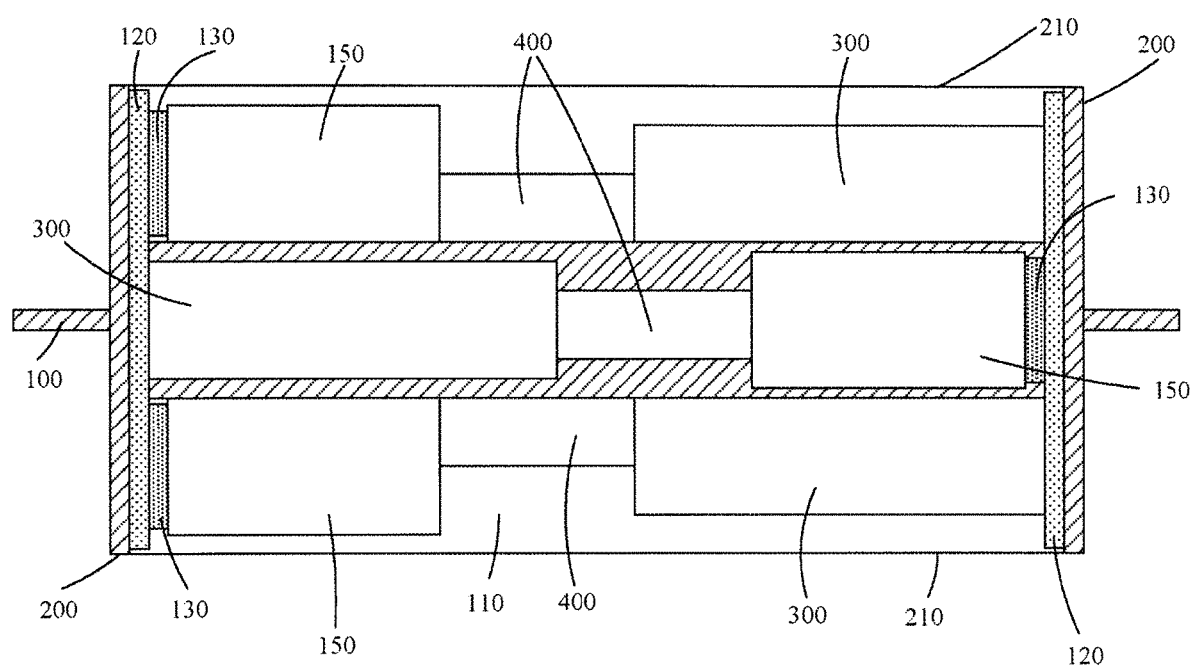
FIG. 5E illustrates a cross sectional view of the power flywheel motor of FIG. 5D, in accordance with one embodiment.

FIG. 5E illustrates a cross sectional view of the power flywheel motor of FIG. 5D, in accordance with one embodiment. As an option, FIG. 5E may be implemented in the context of any one or more of the embodiments set forth in any previous and/or subsequent figure(s) and/or description thereof. Of course, however, FIG. 5E may be implemented in the context of any desired environment. Further, the aforementioned definitions may equally apply to the description below.

The power flywheel motor may include a shaft 100, multiple motor-generators 150, multiple second traction surfaces 130, multiple power supplies 300, and multiple control devices 400. The flywheel assembly is enclosed in a housing 200 and 210 with the first traction surface(s) 120. The cavity 110 is adapted to receive the flywheel assembly. The second traction surfaces 130 may interact with the first traction surfaces 120.

Figure 5F:
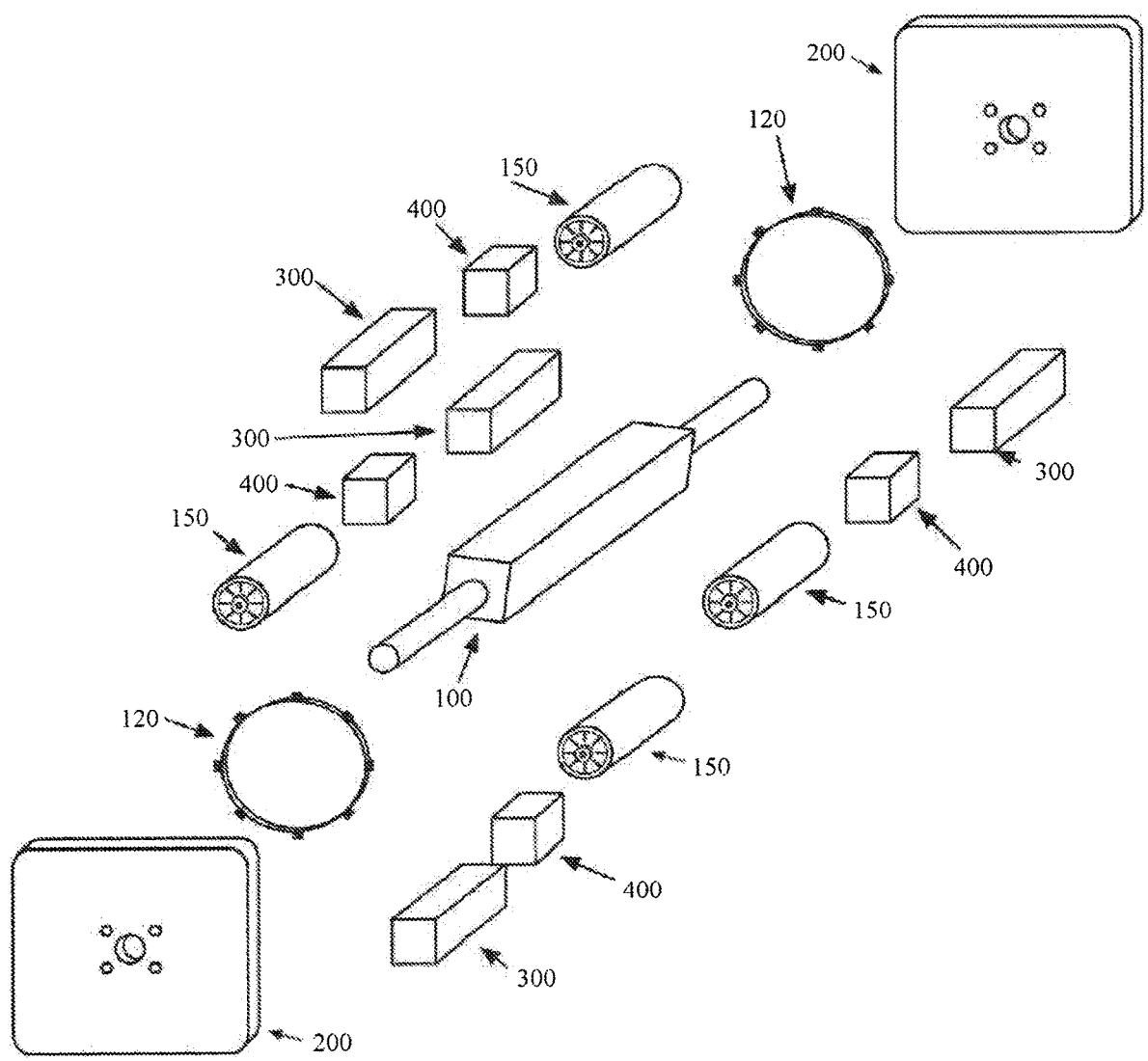
FIG. 5F illustrates exploded view of the internal components of the power flywheel motor of FIG. 5D, in accordance with one embodiment.

FIG. 5F illustrates exploded view of the internal components of the power flywheel motor of FIG. 5D, in accordance with one embodiment. As an option, FIG. 5F may be implemented in the context of any one or more of the embodiments set forth in any previous and/or subsequent figure(s) and/or description thereof. Of course, however, FIG. 5F may be implemented in the context of any desired environment. Further, the aforementioned definitions may equally apply to the description below.

In one embodiment, FIG. 5F displays an assembly which may include a shaft 100, four motor-generators 150, four power supplies 300, and four control devices 400. The flywheel assembly is enclosed between housing walls 200 with two first traction surfaces 120.

Figure 5G:
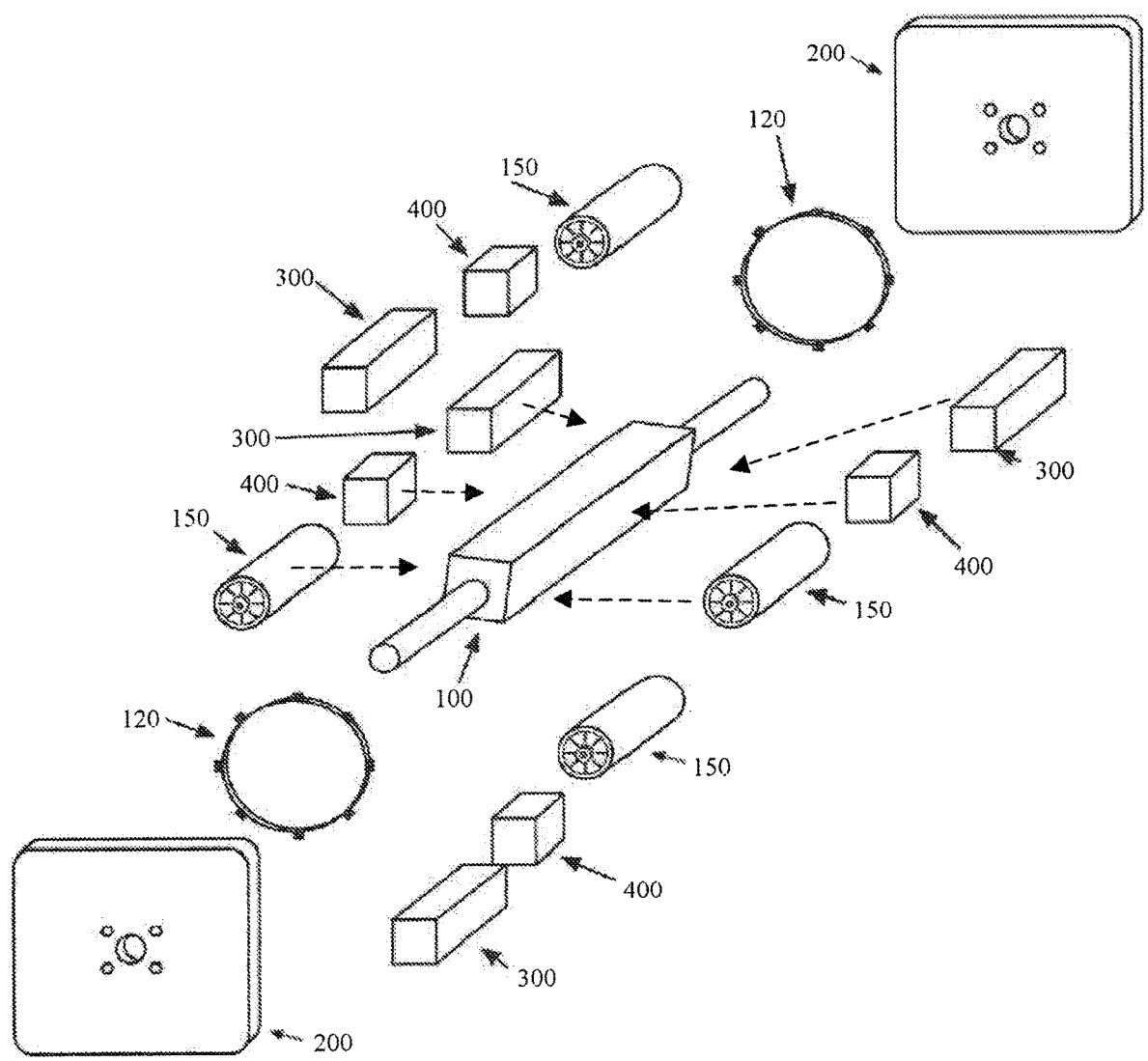
FIG. 5G illustrates a step in constructing a power flywheel motor with a plurality of motor-generators, a plurality of power supply, and a plurality of controls devices, in accordance with one embodiment.

FIG. 5G illustrates a step in constructing a power flywheel motor with a plurality of motor-generators, a plurality of power supply, and a plurality of controls devices, in accordance with one embodiment. As an option, FIG. 5G may be implemented in the context of any one or more of the embodiments set forth in any previous and/or subsequent figure(s) and/or description thereof. Of course, however, FIG. 5G may be implemented in the context of any desired environment. Further, the aforementioned definitions may equally apply to the description below.

As shown, FIG. 5G displays an assembly including a shaft 100, four motor-generators 150, four power supplies 300, and four control devices 400. The flywheel assembly may be enclosed between housing walls 200 each with a first traction surface 120. As shown, the motor-generators 150, the power supply 300, and the control device 400 may each be mounted to the shaft 100.

Figure 5H:
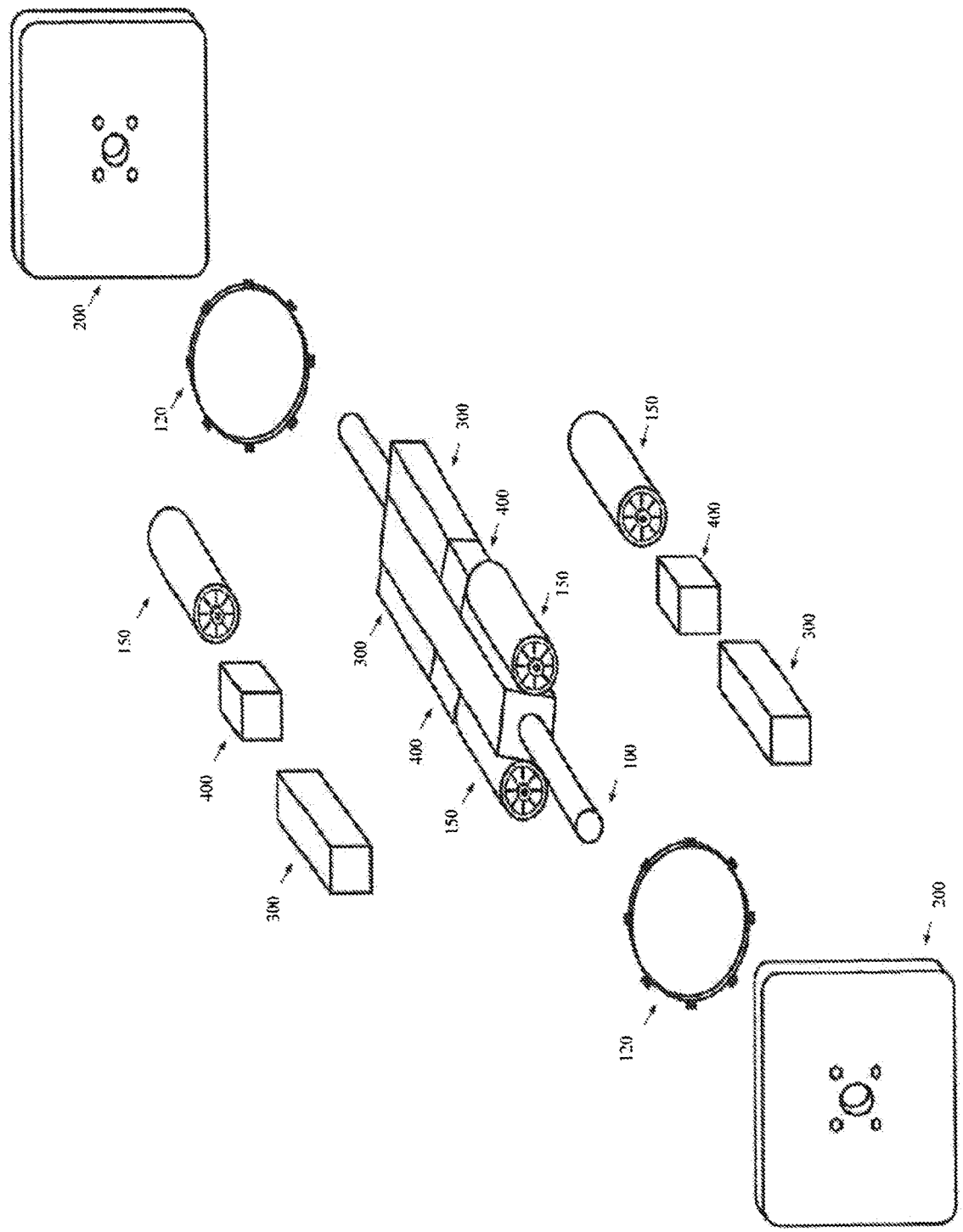
FIG. 5H illustrates a step in constructing a power flywheel motor with a plurality of motor-generators, a plurality of power supply, and a plurality of controls devices, in accordance with one embodiment.
Figure 51:
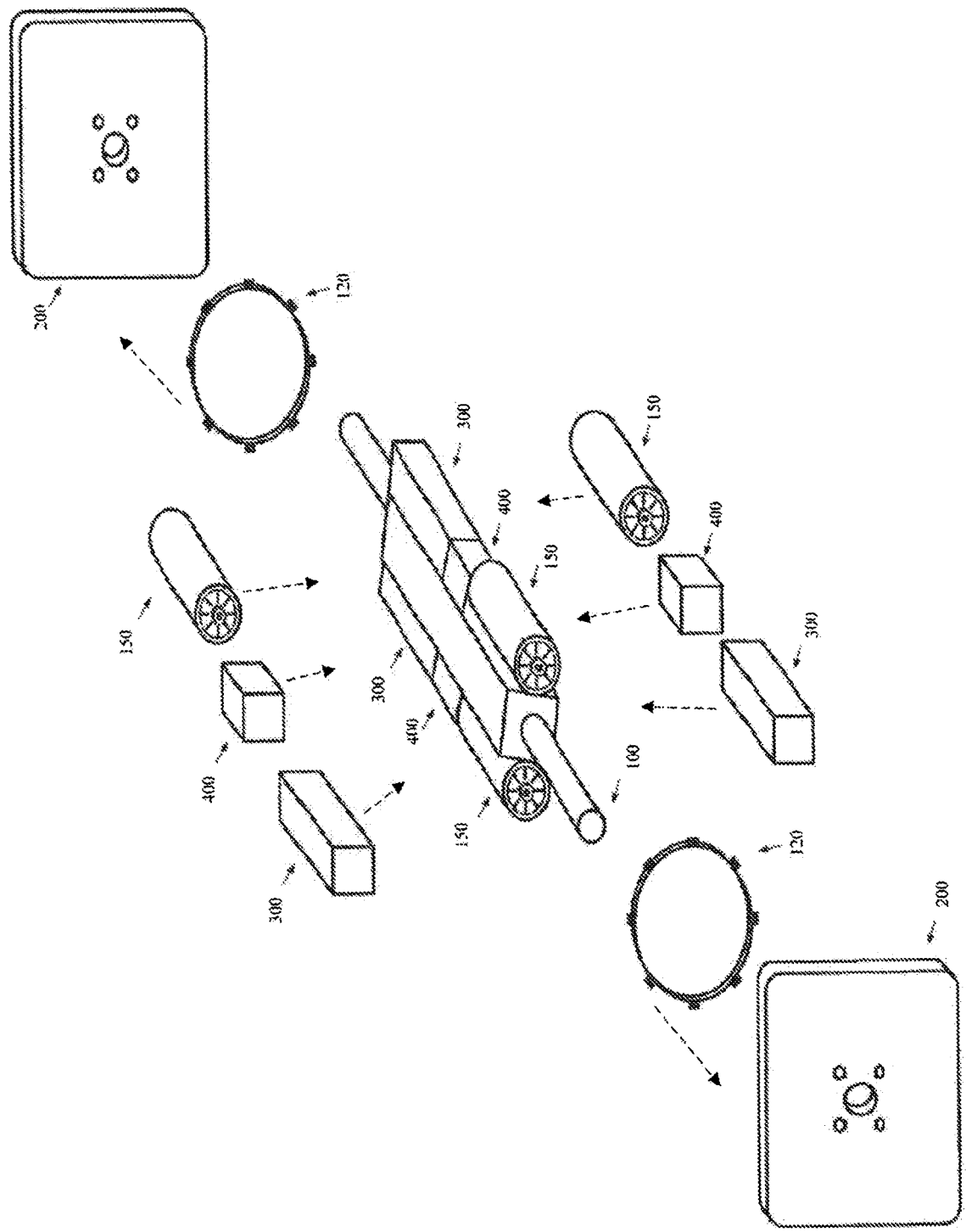

FIG. 5H illustrates a step in constructing a power flywheel motor with a plurality of motor-generators, a plurality of power supply, and a plurality of controls devices, in accordance with one embodiment. As an option, FIG. 5H may be implemented in the context of any one or more of the embodiments set forth in any previous and/or subsequent figure(s) and/or description thereof. Of course, however, FIG. 5H may be implemented in the context of any desired environment. Further, the aforementioned definitions may equally apply to the description below.

As shown, FIG. 5H displays an assembly including a shaft 100, four motor-generators 150, four power supplies 300, and four control devices 400. The flywheel assembly may be enclosed between housing walls 200 with two first traction surface 120. As shown, two of each of the motor-generators 150, the power supply 300, and the control device 400 are displayed in a mounted manner to the shaft 100.

FIG. 5I illustrates a step in constructing a power flywheel motor with a plurality of motor-generators, a plurality of power supply, and a plurality of controls devices, in accordance with one embodiment. As an option, FIG. 5I may be implemented in the context of any one or more of the embodiments set forth in any previous and/or subsequent figure(s) and/or description thereof. Of course, however, FIG. 5I may be implemented in the context of any desired environment. Further, the aforementioned definitions may equally apply to the description below.

As shown, FIG. 5I displays an assembly including a shaft 100, four motor-generators 150, four power supplies 300, and four control devices 400. The flywheel assembly may be enclosed between housing walls 200 with two first traction surfaces 120. As shown, the remaining motor-generators 150, the power supply 300, and the control device 400 not previously displayed as being mounted to the shaft 100 (such as FIG. 5H) may also be mounted to the shaft 100.

Figure 5J:
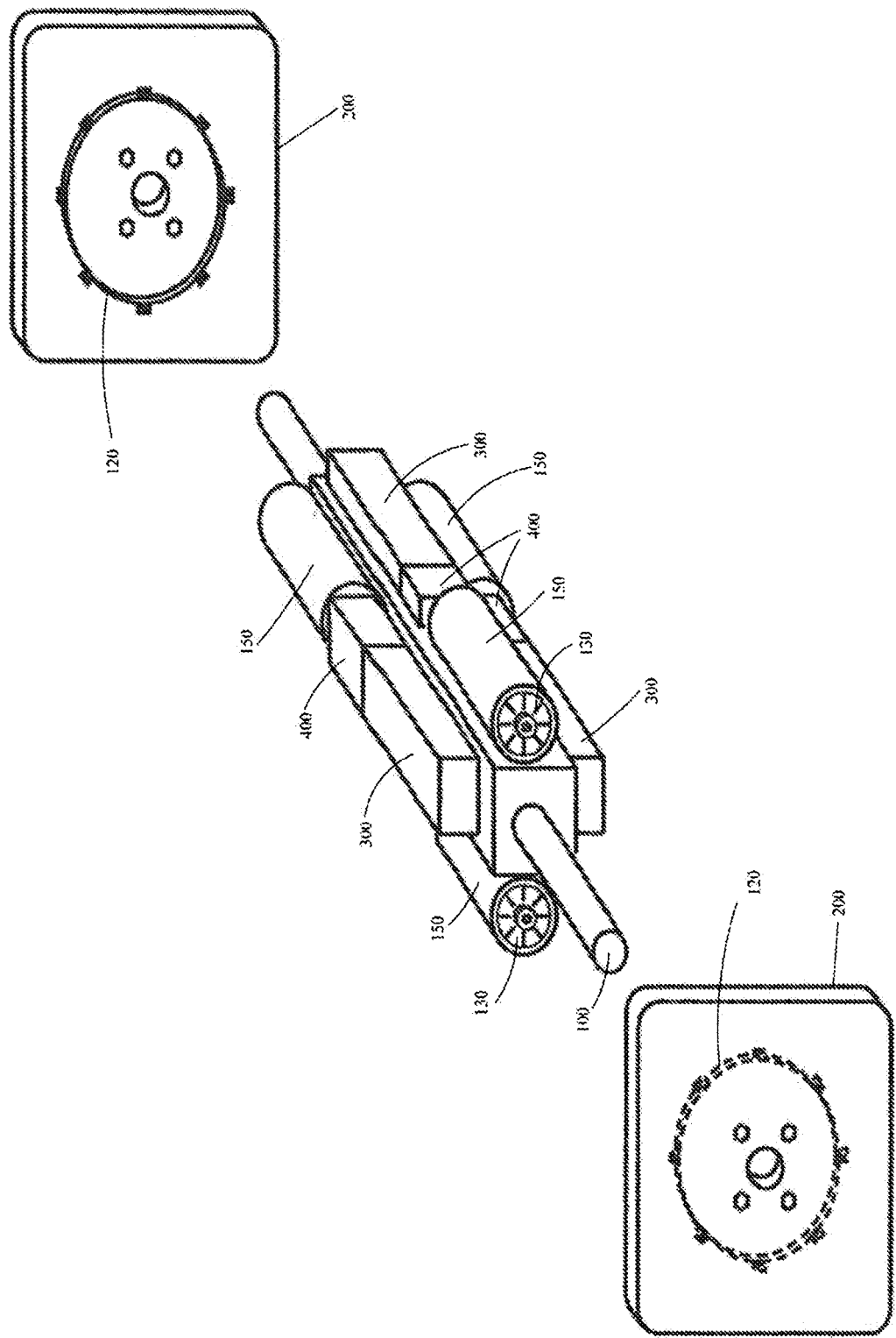
FIG. 5J illustrates a step in constructing a power flywheel motor with a plurality of motor-generators, a plurality of power supply, and a plurality of controls devices, in accordance with one embodiment.

FIG. 5J illustrates a step in constructing a power flywheel motor with a plurality of motor-generators, a plurality of power supply, and a plurality of controls devices, in accordance with one embodiment. As an option, FIG. 5J may be implemented in the context of any one or more of the embodiments set forth in any previous and/or subsequent figure(s) and/or description thereof. Of course, however, FIG. 5J may be implemented in the context of any desired environment. Further, the aforementioned definitions may equally apply to the description below.

As shown, FIG. 5J displays an assembly including a shaft 100, four motor-generators 150, four power supplies 300, and four control devices 400. The flywheel assembly may be enclosed between housing walls 200 each with a first traction surface 120. As shown, each of the four motor-generators 150, the power supply 300, and the control device 400 may each be mounted to the shaft 100, displayed herein in mounted form. Additionally, the first traction surface 120 is displayed as being contained with the housing 200.

Figure 5K:
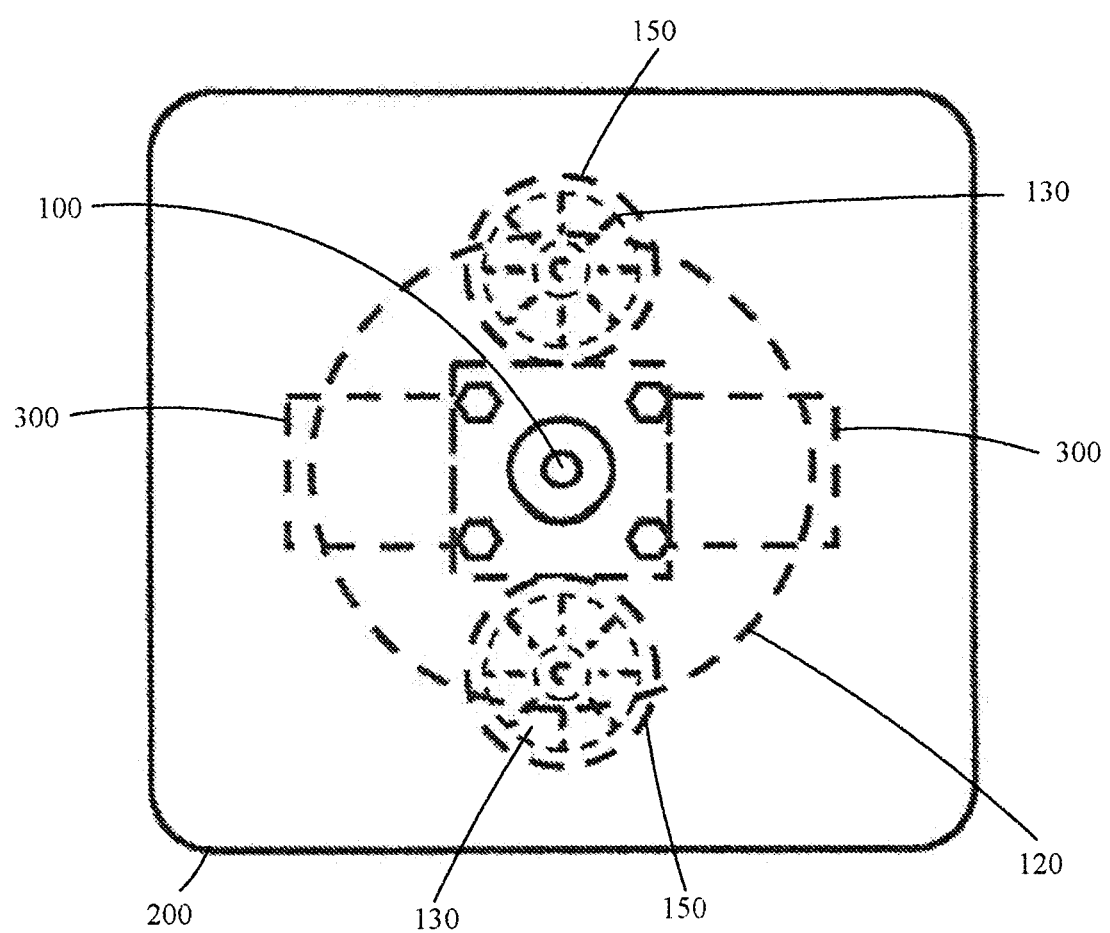
FIG. 5K illustrates an end view with see through parts of a power flywheel motor of FIG. 5D, in accordance with one embodiment.

FIG. 5K illustrates an end view with see through parts of a power flywheel motor of FIG. 5D, in accordance with one embodiment. As an option, FIG. 5K may be implemented in the context of any one or more of the embodiments set forth in any previous and/or subsequent figure(s) and/or description thereof. Of course, however, FIG. 5K may be implemented in the context of any desired environment. Further, the aforementioned definitions may equally apply to the description below.

As shown, in one embodiment, FIG. 5K shows a first position of the second traction surface(s) 130 and the power supplies 300 in relation to the first traction surface 120 as the shaft 100 rotates (as herein described).

Figure 5L:
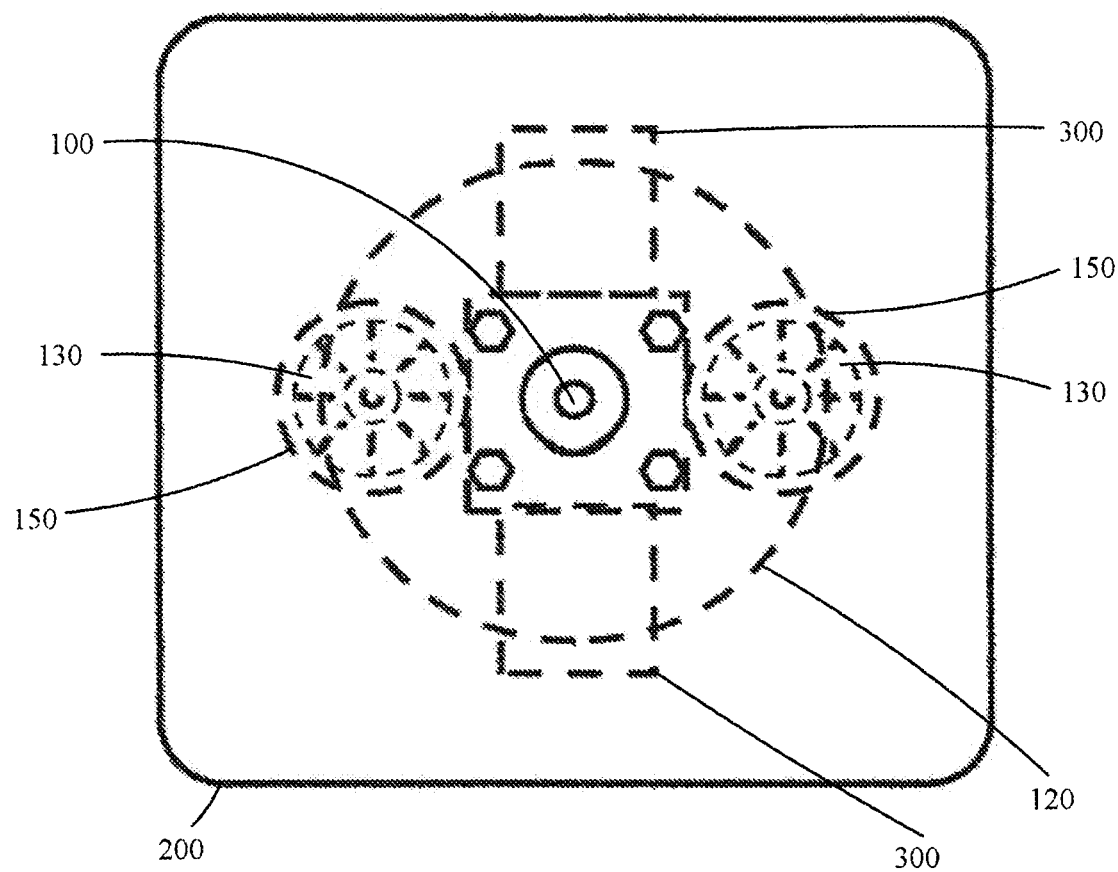
FIG. 5L illustrates an end view with see through parts of a power flywheel motor of FIG. 5D, in accordance with one embodiment.

FIG. 5L illustrates an end view with see through parts of a power flywheel motor of FIG. 5D, in accordance with one embodiment. As an option, FIG. 5L may be implemented in the context of any one or more of the embodiments set forth in any previous and/or subsequent figure(s) and/or description thereof. Of course, however, FIG. 5L may be implemented in the context of any desired environment. Further, the aforementioned definitions may equally apply to the description below.

Figure 5M:
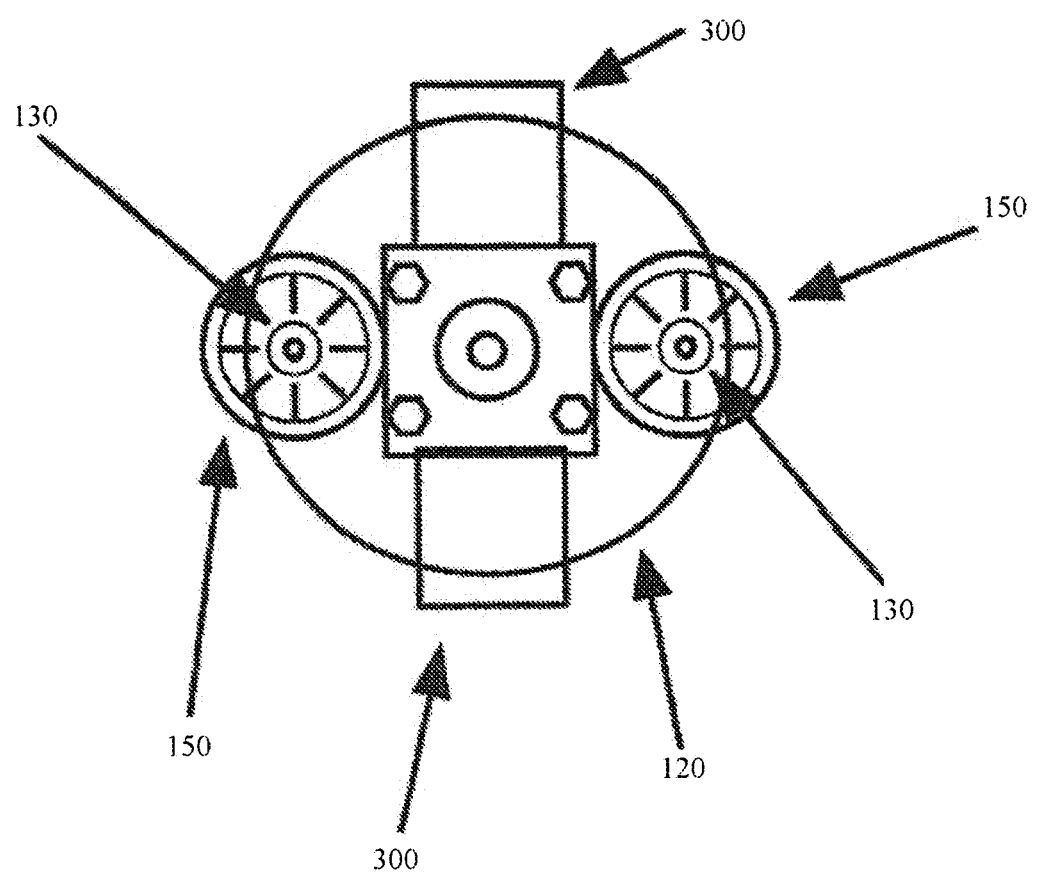
FIG. 5M illustrates an end view of a power flywheel motor of FIG. 5L without the housing wall, in accordance with one embodiment.
Figure 5N:
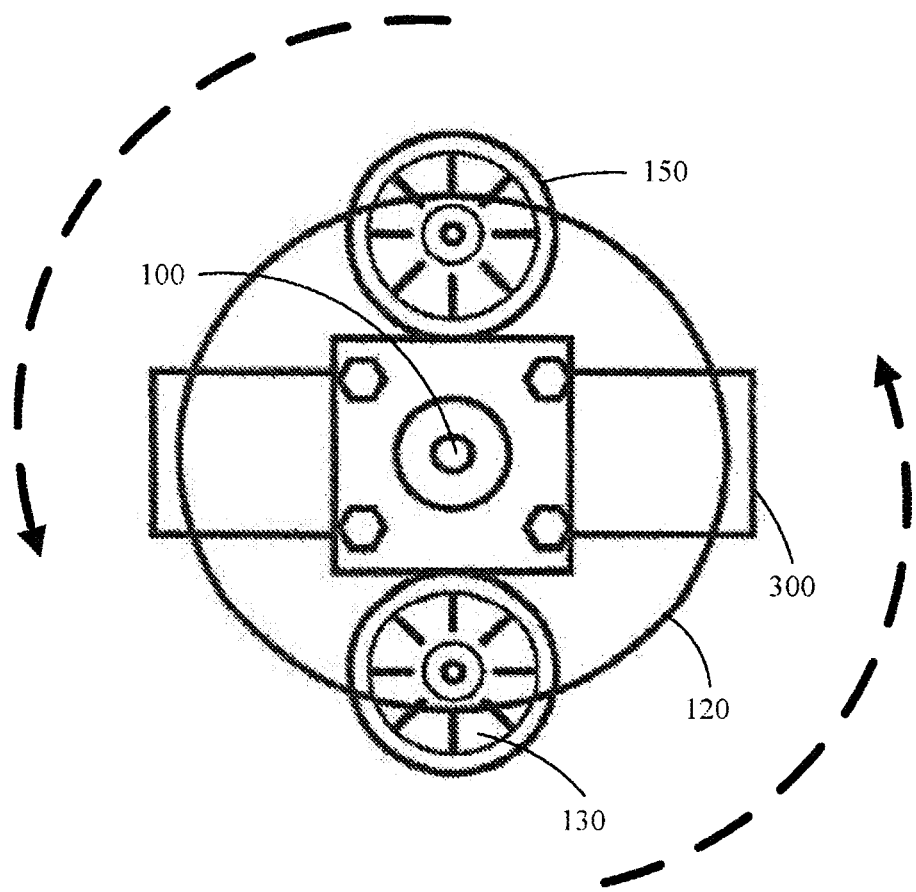
FIG. 5N illustrates an end view of a power flywheel motor showing the direction of rotation, in accordance with one embodiment.

As shown, FIG. 5L shows a second position of the second traction surface 130 and the power supply 300 in relation to the traction surface 120 as the shaft 100 rotates in accordance with the rotational movement of the flywheel assembly (e.g. such as of FIG. 5N).

FIG. 5M illustrates an end view of a power flywheel motor of FIG. 5L without the housing wall 200, in accordance with one embodiment. As an option, FIG. 5L may be implemented in the context of any one or more of the embodiments set forth in any previous and/or subsequent figure(s) and/or description thereof. Of course, however, FIG. 5L may be implemented in the context of any desired environment. Further, the aforementioned definitions may equally apply to the description below.

As shown, FIG. 5M shows a first position of the second traction surface 130 and the power supply 300 in relation to the first traction surface 120 as the shaft 100 rotates in accordance with the rotational movement of the flywheel assembly (e.g. such as of FIG. 5N).

FIG. 5N illustrates an end view of a power flywheel motor showing the direction of rotation, in accordance with one embodiment. As an option, FIG. 5N may be implemented in the context of any one or more of the embodiments set forth in any previous and/or subsequent figure(s) and/or description thereof. Of course, however, FIG. 5N may be implemented in the context of any desired environment. Further, the aforementioned definitions may equally apply to the description below.

As shown, FIG. 5N shows a second position of the second traction surface 130 and the power supply 300 in relation to the first traction surface 120 as the shaft 100 rotates in accordance with the rotational movement of the flywheel assembly (e.g. such as of FIG. 5N). As shown, the circular arrows surrounding the flywheel assembly indicates that the entire assembly may rotate about the shaft 100. In one embodiment, the rotation may be in a counterclockwise manner, but the assembly may be configured to rotate in any specific direction or manner.

Of course, the various embodiments set forth herein may be implemented with any desired combination thereof or with any numbers of motor-generators, control devices, or power supplies.

While some embodiments of the invention have been described, it is understood that the present invention is not intended to be limited only to such embodiments. Additionally, the scope of the preferred embodiment should be defined by the following claims and their equivalents. Moreover, any combination of the above-described elements in all possible variations thereof is encompassed unless otherwise indicated herein or otherwise clearly contradicted by context. Further, the use of the terms "a" and "an" and "the" and similar referents in the context of describing the subject matter (particularly in the context of the claims) are to be construed to cover both the singular and the plural, unless otherwise indicated herein or clearly contradicted by context. No language in the specification should be construed as indicating any non-claimed element as essential to a power flywheel motor as claimed.

What is claimed is:

1. An energy storage and release device comprising:
   a shaft rotatable about a first axis;
   a flywheel coupled coaxially to the shaft and including a motor-generator coupled to the flywheel such that a mass of the motor-generator contributes to an energy storage capacity of the flywheel at a selected rotation speed of the flywheel, wherein the motor-generator comprises a first traction surface rotatable about a second axis substantially parallel to the first axis;

a housing comprising a second traction surface and a cavity configured to receive the shaft and the flywheel, wherein the second traction surface and the first traction surface are configured to interact to enable the motor-generator to facilitate the storage or release of energy; and an electrical connector connected to the motor-generator and configured to enable flow of electrical current to enable the storage or the release of the energy.

2. The device of claim 1, wherein the electrical connector is further configured to communicate an electrical signal that causes the motor-generator to rotate the first traction surface to facilitate the storage of the energy by causing the rotation speed of the flywheel to increase.

3. The device of claim 1, wherein the electrical connector is further configured to communicate an electrical signal to enable the release of energy, the release of energy being associated with a decrease in the rotation speed of the flywheel and being facilitated by the interaction between the first traction surface and the second traction surface.

4. The device of claim 1,
wherein the flywheel includes a power supply coupled to the flywheel such that the mass of the power supply contributes to the energy storage capacity of the flywheel at the selected rotation speed of the flywheel, and
wherein the power supply is coupled to the flywheel at a location that facilitates a balance of the center of the mass of the flywheel about the first axis, the device further comprising a second electrical connection connected to the power supply and the motor-generator.

5. The device of claim 4, wherein the first electrical connection and the second electrical connection are a same single electrical connection.

6. The device of claim 4 further comprising:
a control device configured to balance the center of the mass of the flywheel about the first axis; and
a third electrical connection connected to the control device and the motor-generator,
wherein the third electrical connection is configured to communicate an electrical signal, and
wherein the control device facilitates an energy profile of the flywheel.

7. The device of claim 1,
wherein the second traction surface of the housing comprises a ring gear, and
wherein the first traction surface comprises a gear adapted to interact with the ring gear.

8. The device of claim 1, wherein the flywheel further includes a plurality of motor-generators coupled to the flywheel such that the mass of the motor-generators contributes to the energy storage capacity of the flywheel at the selected rotation speed of the flywheel, wherein the motor-generators are coupled to the flywheel at locations that facilitate a balance of the center of the mass of the flywheel about the first axis.

9. The device of claim 8, wherein the flywheel further includes a plurality of power sources coupled to the flywheel such that the mass of the power sources contributes to the energy storage capacity of the flywheel at the selected rotation speed of the flywheel, wherein the power sources are coupled to the flywheel at locations that facilitate the balance of the center of the mass of the flywheel about the first axis.

* * * * *